(12) United States Patent
Abhishek et al.

(10) Patent No.: US 10,748,002 B2
(45) Date of Patent: Aug. 18, 2020

(54) CONTEXT-AWARENESS

(71) Applicant: Microsoft Technology Licensing, LLC, Redmond, WA (US)

(72) Inventors: Abhishek Abhishek, Sammamish, WA (US); Khawar Zuberi, Bellevue, WA (US); Jie Liu, Medina, WA (US); Rouzbeh Aminpour, Bellevue, WA (US); Zhengyou Zhang, Mercer Island, WA (US); Ali Dalloul, Newcastle, WA (US); Dimitrios Lymberopoulos, Kirkland, WA (US); Michel Goraczko, Seattle, WA (US); Tony Capone, Redmond, WA (US); Di Wang, Sammamish, WA (US); Yi Lu, Redmond, WA (US); Yasser B. Asmi, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 126 days.

(21) Appl. No.: 15/965,581

(22) Filed: Apr. 27, 2018

(65) Prior Publication Data
US 2019/0332864 A1 Oct. 31, 2019

(51) Int. Cl.
*G06K 9/00* (2006.01)
*G06F 3/01* (2006.01)
*G06F 16/903* (2019.01)

(52) U.S. Cl.
CPC .......... *G06K 9/00671* (2013.01); *G06F 3/011* (2013.01); *G06F 3/017* (2013.01);
(Continued)

(58) Field of Classification Search
CPC .... G06F 9/00671; G06F 16/903; G06F 3/011; G06K 9/0201; G06K 9/00335
(Continued)

(56) References Cited

U.S. PATENT DOCUMENTS

| 6,725,206 B1 | 4/2004 | Coveley |
| 6,903,656 B1 | 6/2005 | Lee |

(Continued)

FOREIGN PATENT DOCUMENTS

| AU | 2015101078 B4 | 4/2016 |
| WO | 2013157996 A2 | 10/2013 |
| WO | 2017029718 A1 | 2/2017 |

OTHER PUBLICATIONS

"Retailers' Guide to Creating Personalized Shopping Experiences", Retrieved From <<http://web.archive.org/web/20140912085037/https://www.intel.com/content/dam/www/public/us/en/documents/guides/retailers-creating-personalized-shopping-experiences-guide.pdf>>, Sep. 12, 2014, pp. 1-15.

(Continued)

*Primary Examiner* — Marceau Milord
(74) *Attorney, Agent, or Firm* — Rainier Patents, P.S.

(57) ABSTRACT

The discussion relates to context-aware environments. One example can include inwardly-facing cameras positioned around a periphery of an environment that defines a volume. The example can also include sensors positioned relative to the volume and configured to communicate with a user device in the volume. The example can also include an ambient perception component configured to track user locations in the volume and to detect user gestures relative to objects in the volume, and responsive to receiving a query from the user's device, to supplement the query with information derived from the objects.

20 Claims, 13 Drawing Sheets

METHOD 600

(52) U.S. Cl.
CPC ....... *G06F 16/903* (2019.01); *G06K 9/00201* (2013.01); *G06K 9/00335* (2013.01)

(58) Field of Classification Search
USPC ........................................................ 382/103
See application file for complete search history.

(56) References Cited

U.S. PATENT DOCUMENTS

| | | | |
|---|---|---|---|
| 7,076,441 | B2 | 7/2006 | Hind et al. |
| 8,671,018 | B2 | 3/2014 | Thomas et al. |
| 9,396,491 | B2 * | 7/2016 | Isaacson ............... G06F 16/248 |
| 9,430,794 | B2 * | 8/2016 | Isaacson ............... G06F 3/0484 |
| 9,734,526 | B2 * | 8/2017 | Isaacson ............... G06F 16/248 |
| 9,916,010 | B2 * | 3/2018 | Harris ..................... G06F 3/017 |
| 10,152,756 | B2 * | 12/2018 | Isaacson ............. G06Q 30/0613 |
| 10,318,917 | B1 | 6/2019 | Goldstein et al. |
| 10,332,170 | B2 * | 6/2019 | Isaacson ............... G06F 16/248 |
| 10,643,174 | B1 | 5/2020 | Hum |
| 2002/0170961 | A1 | 11/2002 | Dickson et al. |
| 2003/0171944 | A1 | 9/2003 | Fine et al. |
| 2006/0028552 | A1 | 2/2006 | Aggarwal et al. |
| 2007/0024580 | A1 | 2/2007 | Sands et al. |
| 2009/0254824 | A1 | 10/2009 | Singh |
| 2010/0030578 | A1 * | 2/2010 | Siddique ............ G06Q 10/0637 705/3 |
| 2011/0087497 | A1 | 4/2011 | Avallone et al. |
| 2013/0054395 | A1 | 2/2013 | Cyr et al. |
| 2013/0166332 | A1 * | 6/2013 | Hammad ............... G06Q 40/10 705/5 |
| 2013/0204886 | A1 * | 8/2013 | Faith ................... G06Q 30/0643 707/756 |
| 2013/0215116 | A1 * | 8/2013 | Siddique ............ G06Q 30/0643 345/420 |
| 2013/0282533 | A1 | 10/2013 | Foran-Owens et al. |
| 2014/0258007 | A1 | 9/2014 | Calman et al. |
| 2014/0258055 | A1 * | 9/2014 | Wolfe ................. G06Q 20/105 705/30 |
| 2014/0358666 | A1 | 12/2014 | Baghaie et al. |
| 2015/0012358 | A1 | 1/2015 | Almendras riesco |
| 2015/0012396 | A1 | 1/2015 | Puerini et al. |
| 2015/0019391 | A1 | 1/2015 | Kumar et al. |
| 2015/0023602 | A1 * | 1/2015 | Wnuk ................. G06K 9/00671 382/190 |
| 2015/0039458 | A1 | 2/2015 | Reid |
| 2015/0085111 | A1 | 3/2015 | Lavery |
| 2015/0088923 | A1 | 3/2015 | Garcia-barrio et al. |
| 2015/0193005 | A1 | 7/2015 | Di censo et al. |
| 2016/0109954 | A1 * | 4/2016 | Harris ..................... G06F 3/017 345/156 |
| 2016/0210602 | A1 * | 7/2016 | Siddique ............ G06Q 20/0453 |
| 2016/0378861 | A1 * | 12/2016 | Eledath .............. G06K 9/00718 707/766 |
| 2017/0038916 | A1 | 2/2017 | Beach ................. G06F 16/9535 |
| 2017/0083911 | A1 | 3/2017 | Phillips |
| 2017/0193301 | A1 * | 7/2017 | Wexler ............... G06K 9/00355 |
| 2017/0213224 | A1 | 7/2017 | DeLuca et al. |
| 2017/0372401 | A1 | 12/2017 | Wang et al. |
| 2018/0032997 | A1 * | 2/2018 | Gordon .............. G06Q 20/3224 |
| 2018/0240180 | A1 * | 8/2018 | Glaser ................ G06K 9/00671 |
| 2019/0007381 | A1 * | 1/2019 | Isaacson ............ G06Q 30/0641 |
| 2019/0138975 | A1 | 5/2019 | Zuberi et al. |
| 2019/0141021 | A1 * | 5/2019 | Isaacson ............. H04L 63/0807 |
| 2019/0156082 | A1 | 5/2019 | Berg et al. |
| 2019/0244161 | A1 | 8/2019 | Abhishek et al. |
| 2019/0281030 | A1 * | 9/2019 | Isaacson ............... G06F 16/951 |
| 2019/0303807 | A1 * | 10/2019 | Gueye .................... G06Q 10/02 |
| 2019/0332863 | A1 | 10/2019 | Abhishek et al. |

OTHER PUBLICATIONS

"How Stores Follow Every Step You Take", Retrieved From: https://web.archive.org/web/20141227161320/http:/www.theatlantic.com/sponsored/ibm-transformation/how-stores-follow-every-step-you-take/240/, Dec. 27, 2014, 6 Pages.

"RFID: Success Strategies for Apparel Retailers", Retrieved from: https://retail.economictimes.indiatimes.com/news/industry/rfid-success-strategies-for-apparel-retailers/58838868, May 25, 2017, 10 pages.

"Standard Cognition Announces First Commercially Available Checkout-free AI Shopping System", Retrieved From: http://www.marketwired.com/press-release/standard-cognition-announces-first-commercially-available-checkout-free-ai-shopping-2230857.htm, Aug. 21, 2017, 3 Pages.

"Non-Final Office Action Issued in U.S. Appl. No. 15/805,038", dated Jan. 10, 2020, 8 Pages.

"Non-Final Office Action Issued in U.S. Appl. No. 15/887,967", dated Nov. 29, 2019, 16 Pages.

"Non Final Office Action Issued in U.S. Appl. No. 15/965,404", dated Nov. 25, 2019, 7 Pages.

Anscombe, Luke, "Westfield is using facial detection software to watch how you shop", Retrieved From: http://www.news.com.au/finance/business/retail/westfield-is-using-facial-detection-software-to-watch-how-you-shop/news-story/7d0653eb21fe1b07be51d508bfe46262, Oct. 19, 2017, 4 Pages.

Bishop, Todd, "Amazon Go is finally a go: Sensor-infused store opens to the public Monday, with no checkout lines", Retrieved From: https://www.geekwire.com/2018/check-no-checkout-amazon-go-automated-retail-store-will-finally-open-public-monday/, Jan. 21, 2018, 25 Pages.

Henry, Alan, "How Retail Stores Track You Using Your Smartphone (and How to Stop It)", Retrieved From: https://lifehacker.com/how-retail-stores-track-you-using-your-smartphone-and-827512308, Jul. 19, 2013, 8 Pages.

Lasher, et al., "Amazon Go: Using RFID to Change the Shopping Experience", Retrieved from: http://angsila.cs.buu.ac.th/~57160034/887492/week1/amazon.pdf, Retrieved Date: Sep. 4, 2017, 8 Pages.

"International Serach Report and Written Opinion Issued in PCT Application No. PCT/US2018/058070", dated Jan. 4, 2019, 11 Pages.

"International Search Report and Written Opinion Issued in PCT Application No. PCT/US2019/028421", dated Aug. 7, 2019, 13 Pages.

Sun, Yiting, "In China, a Store of the Future—No Checkout, No Staff", Retrieved From: https://www.technologyreview.com/s/608104/in-china-a-store-of-the-future-no-checkout-no-staff/, Jun. 16, 2017, 9 Pages.

Anderson, T. J., "How RFID in Retail Is Improving Customer Experience", Retrieved from: https://web.archive.org/web/20161026160318/https://msmsolutions.com/rfid-in-retail-improving-customer-experience/, Oct. 5, 2016, 5 Pages.

"Final Office Action Issued in U.S. Appl. No. 15/887,967", dated May 15, 2020, 19 Pages.

* cited by examiner

CONTEXT-AWARENESS

BRIEF DESCRIPTION OF THE DRAWINGS

The accompanying drawings illustrate implementations of the concepts conveyed in the present patent. Features of the illustrated implementations can be more readily understood by reference to the following description taken in conjunction with the accompanying drawings. Like reference numbers in the various drawings are used wherever feasible to indicate like elements. In some cases, parentheticals are utilized after a reference number to distinguish like elements. Use of the reference number without the associated parenthetical is generic to the element. Further, the left-most numeral of each reference number conveys the figure and associated discussion where the reference number is first introduced.

DETAILED DESCRIPTION

This description relates to sensing users and objects in environments, such as industrial, medical, and/or retail environments. The sensing can provide information about the user, the objects, the environment, and/or their interrelationships. This information can be used to augment (e.g., supplement) interactions relative to the environment. From one perspective, the information can be thought of as providing environmental context to the user's interactions in the environment. This environmental context can enable augmented (e.g., improved) functionality to the user than could otherwise be obtained for a given user input. In one such case, the sensing can identify what object the user is looking at when the user interacts with his/her personal user device (e.g., submits a query). Information about the object that the user is looking at can be used to augment the query and thereby enhance the user experience (e.g., provide more meaningful results than would be obtained without the environmental context).

Figure 1A:
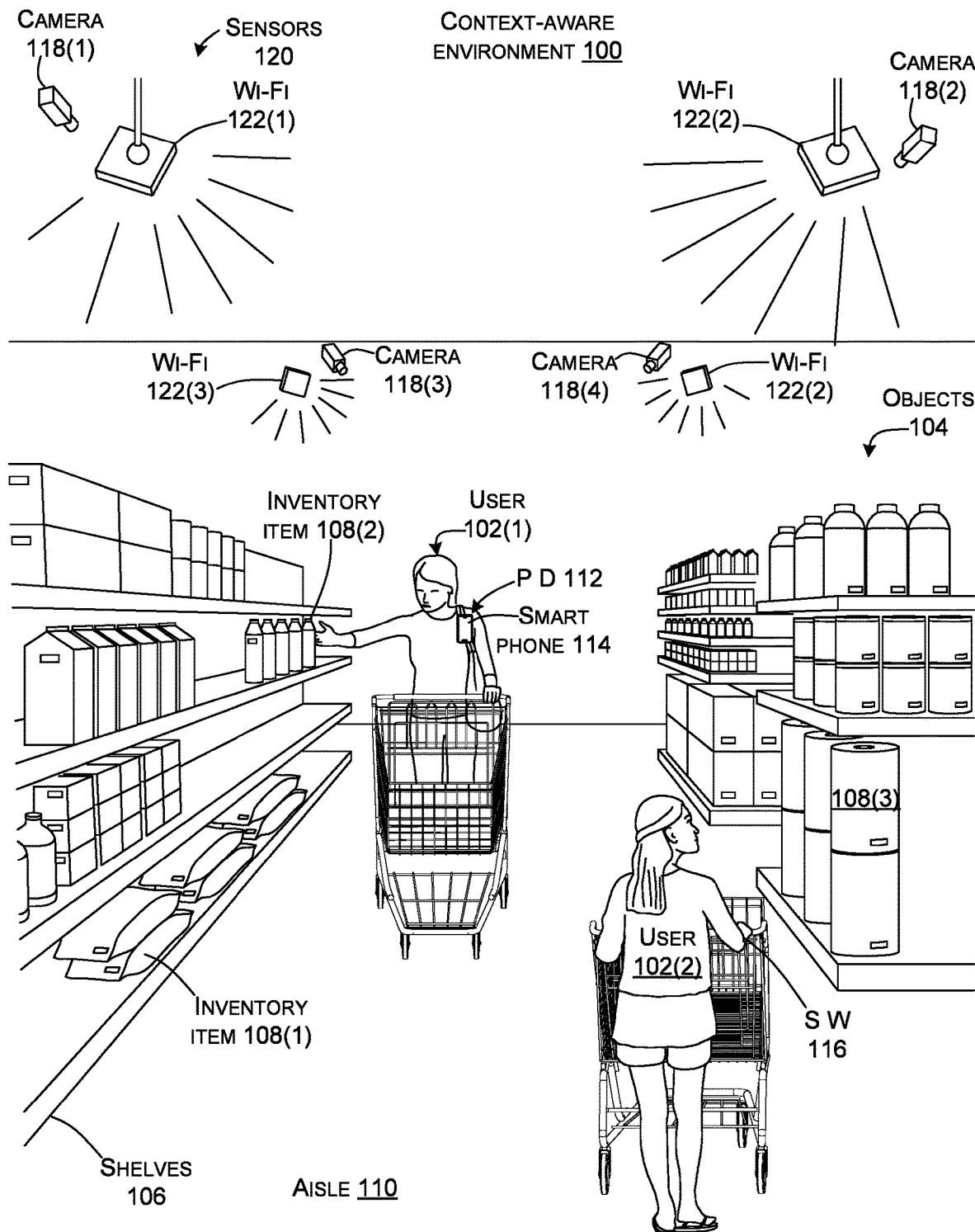
FIGS. 1A-1G collectively show context-aware example scenarios in accordance with some implementations of the present concepts.

FIGS. 1A-1G collectively show an example context-aware environment 100. In this case, FIG. 1A shows the context-aware environment includes users 102 and objects 104. In this example, the objects 104 can include shelves 106, inventory items 108, aisles 110, and/or personal devices 112. Other examples of objects 104 can include racks, tables, and/or machines, among others. The users may be in possession of, or associated with, the personal devices (e.g., user devices) 112, such as a smart phone 114 and/or a smart watch 116, among others.

The context-aware environment 100 can also include cameras 118 and/or sensors 120. The cameras 118 can include visible light cameras and/or non-visible light cameras. The cameras can be 2D cameras and/or 3D cameras. At least some of the cameras 118 can be positioned in an inwardly looking fashion, such as around a periphery of context-aware environment 100 and toward the user. The user may be in the context-aware environment and may interact with objects in the context-aware environment and/or have an outwardly looking perspective from within the context-aware environment. From one perspective, the context-aware environment 100 can be viewed as defining a volume and some of the cameras 118 and/or sensors 120 can be positioned to capture portions of the volume that include interactions between the user and objects in the volume.

As the users 102 enter and move through the context-aware environment 100, the cameras 118 and/or sensors 120 can provide data (images and/or video) that can be used to identify the users. This aspect can occur while safeguarding users' privacy. For instance, this aspect can proceed only under conditions agreed to in advance by the user. For example, the user may have an account with an entity associated with the context-aware environment. The user, via his/her account may have agreed in advance to be identified to obtain conveniences beyond those otherwise available to the user. Some of these conveniences are described below.

The user can be identified using various techniques. For instance, the user may be identified via communication with their personal device and/or using camera data. In the latter case, this user may have a photo and/or other biometric features on file with his/her signed agreement. Users who have not agreed to identification can be handled in a manner that protects the user's identity. For instance, the camera data may be used to track locations of users in the context-aware environment, without performing facial recognition, or other forms of identification. Assume for purposes of explanation that in the present scenario user 102(1) is identified as 'Jane' and user 102(2) is identified as 'Mary.'

Various types of sensors 120 can be employed in context-aware environment 100. Some of the sensors 120 can be employed to sense objects 104 in the context-aware environment 100. In this example, the sensors 120 can include RFID sensors, NFC sensors, and/or weight sensors (e.g., scales), among others, for sensing the presence and/or location of objects. For instance, inventory items 108 may include RFID tags, and the sensors may include RFID sensors for locating the inventory items. These and/or other sensors 120 may be configured to communicate with and/or locate the users personal devices 112. For instance, sensors can include Wi-Fi sensors or hotspots 122 that can communicate with the users' personal devices and/or determine their (e.g., the devices') location. For instance, Wi-Fi hotspots 122 may communicate with the users' personal devices 112 and determine identities of the personal devices and/or the location of individual personal devices, such as via triangulation. Alternatively or additionally, the sensors can include Bluetooth sensors and/or near field communication (NFC) sensors.

Data from the cameras 118 and/or sensors 120 can be used to identify which users are in possession of which personal devices. For instance, the camera data can indicate that since entering the context-aware environment, user 102(1) took five steps and turned right and took three more steps. At the same time, facial recognition can be performed on the camera data to match user 102(1) to a stored photo of Jane Doe. Simultaneously, the camera data can indicate that user 102(2) came in to the context-aware environment, took two steps, turned right for ten steps, turned left for five steps and left again for two steps. During this time, sensor 120 can communicate with smart phone 114 and smart watch 116 and determine their locations. The sensors 120 can obtain micro electromechanical systems (MEMS) information from the personal devices. For instance, the MEMS information can include accelerometer data and gyroscopic data, among others. The sensor data can then be matched to the camera data to determine which user is co-located with (e.g., in possession of) which personal device. In the illustrated example, the MEMS data from smart phone 114 matches the biometric movements of user 102(1) and the MEMS data from smart watch 116 matches biometric movements of user 102(2).

In FIG. 1A, the camera data can indicate that user 102(1) is picking up inventory item 108(2) (e.g., apple juice). Meanwhile, user 102(2) is looking at inventory item 108(3) (e.g., paper towels).

Figure 1B:
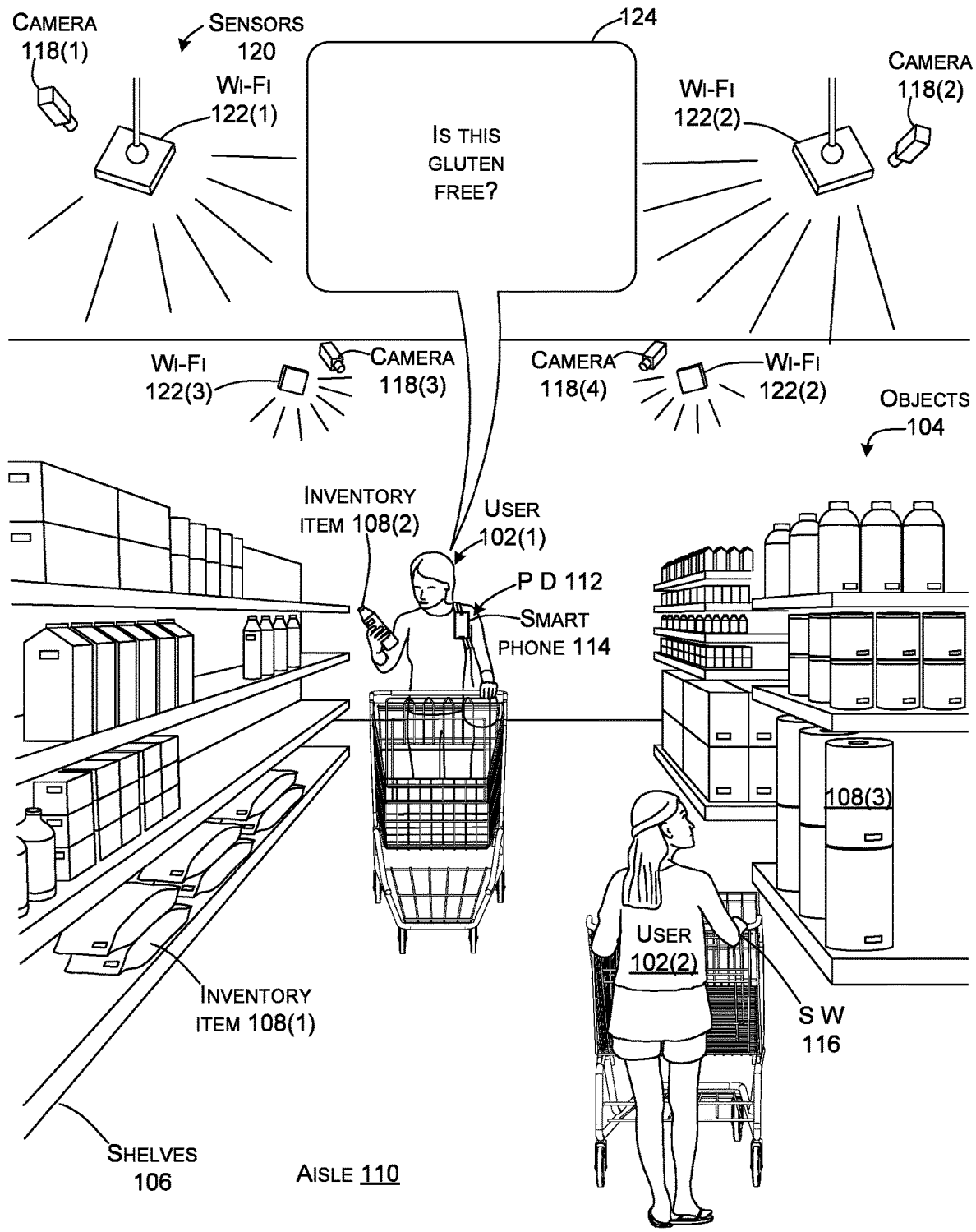

FIG. 1B shows user 102(1) holding and inspecting inventory item 108(2). Data from cameras 118 and/or sensors 120 can be used to identify the inventory item 108(2). Data from cameras 118 can be used to identify user gestures or actions, such as picking up an item and looking at an item. In this case, assume that the user asks (e.g., queries) her smart phone 114 (e.g., a digital assistant or app on the smart phone) "Is this gluten free?" as indicated at 124. Traditionally, one technical problem from this scenario is that the smart phone has no way of understanding the pronoun in the query. In this example, the information in the query could not produce meaningful results if submitted as a search query to a search engine.

However, the present concepts can utilize the camera and sensor data to augment (e.g., supplement) the query with contextual information relating to the query. For instance, the contextual information could indicate that the user was looking at inventory item 108(2) when the user uttered the query and that inventory item 108(2) is a bottle of apple juice. Thus, the query could be updated to "Is apple juice gluten free?". Or the query could be updated to "Do 12-ounce bottles of ABC123 brand apple juice contain gluten?". With existing technologies, the user would either get an erroneous answer, such as a definition of gluten or the user has to take the time to enter a more detailed query that defines what 'this' is.

From one perspective a technical solution offered by the present concepts is using data from the inwardly-facing cameras 118 and/or sensors 120 to provide context to the user query that allows query pronouns to be understood. This technical solution provides more meaningful results (e.g., a better answer) to the user and hence a better user experience. Thus, results can be returned that accurately answer the user's query.

Figure 1C:
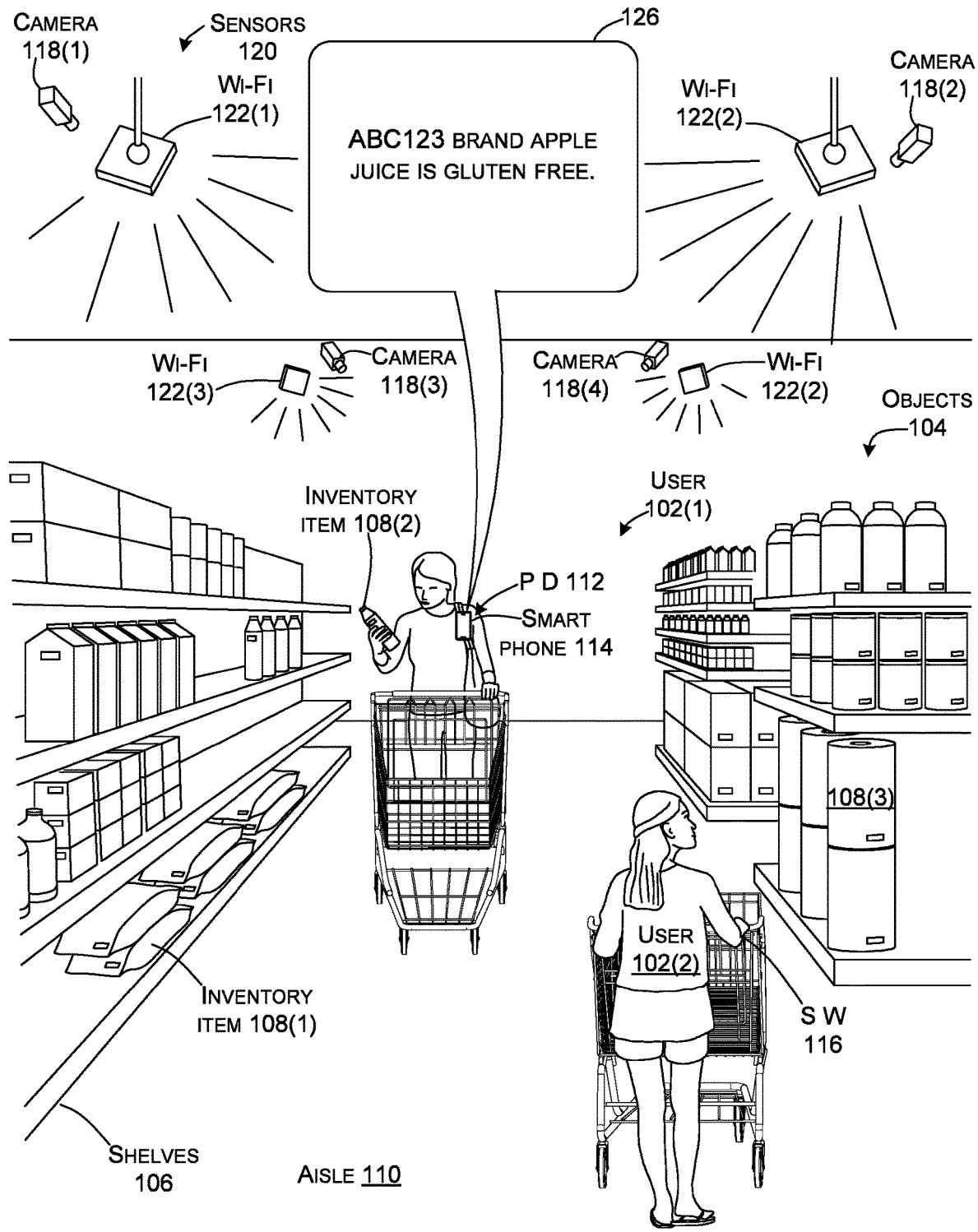

FIG. 1C shows example results as "ABC123 brand apple juice is gluten free." as indicated at 126. The results could be obtained using various search techniques. For example, the context enhanced query can be searched by a search tool against a database of information about inventory items in the context-aware environment. Alternatively, the context enhanced query could be submitted to a broader search tool, such as a search engine and the results from the search engine can be returned to the user's personal device.

Figure 1D:
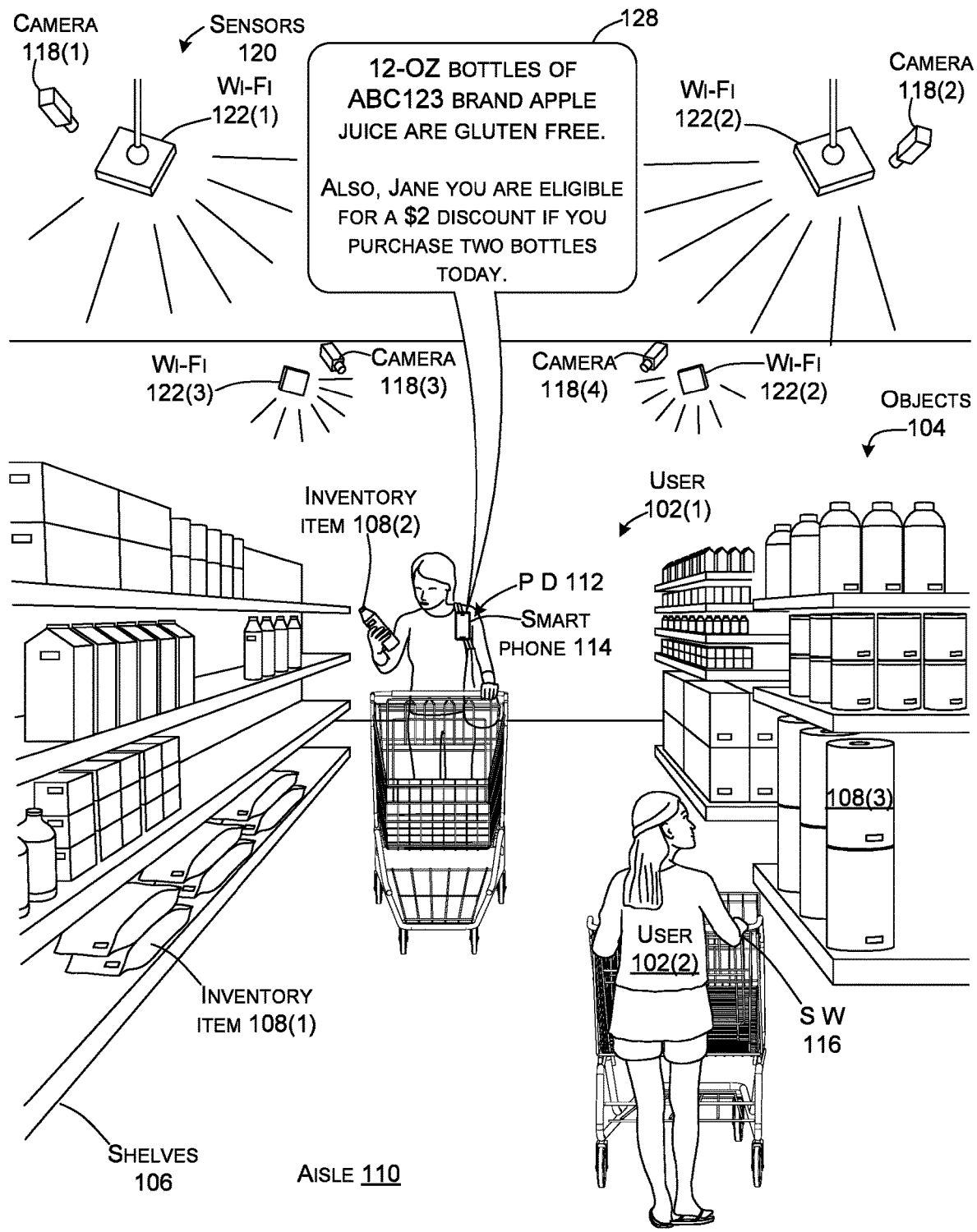

FIG. 1D shows an alternative response to the user query at 128. In this case, an answer is provided to the user that "12-oz bottles of ABC123 brand apple juice are gluten free." Further, additional contextual information is provided to the user. In this case the additional contextual information is customized based upon the user's interest in this product in this context-aware environment 100. The example additional contextual information explains that "Also, Jane you are eligible for a $2 discount if you purchase two bottles today." Thus, the additional contextual information can provide a targeted shopping experience to the user without any effort on her part. This implementation can provide effortless convenience to the user. Stated another way, the user can save money on the things they are interested in in real-time without hunting for deals, coupons, etc.; without doing anything extra.

Figure 1E:
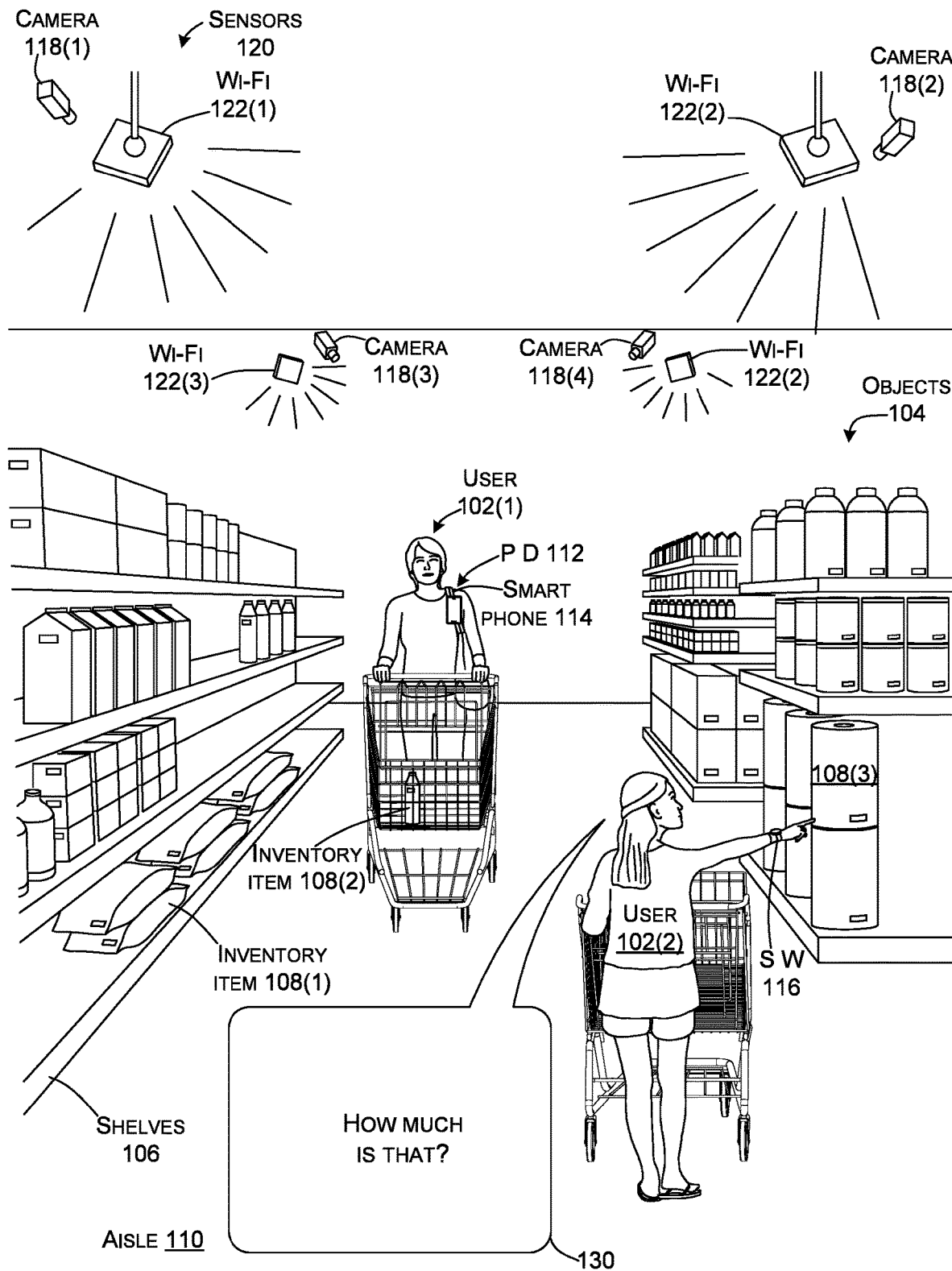

FIG. 1E shows another scenario involving context-aware environment 100. In this example, user 102(2) is pointing at inventory item 108(3) (e.g., Brand X paper towels) while querying to her smart watch 116, "How much is that?" at 130. The smart watch 116 operating alone cannot obtain a meaningful answer to the user's query. However, the inwardly-facing cameras 118 can provide context to the query. The user's gesture of pointing can be identified from the camera data. Further, the camera data can identify the inventory item 108(3) that the user is pointing at. This contextual information that the user made a pointing gesture while emitting the query and that the pointing gesture was directed to inventory item 108(3) can be used to augment the query. Thus, the context-enhanced query can be viewed as "How much are Brand X paper towels?". This context-enhanced query can be answered from a database of information (e.g., object database) about the inventory items 108 in the context-aware environment 100. Example results are shown relative to FIG. 1F.

Figure 1F:
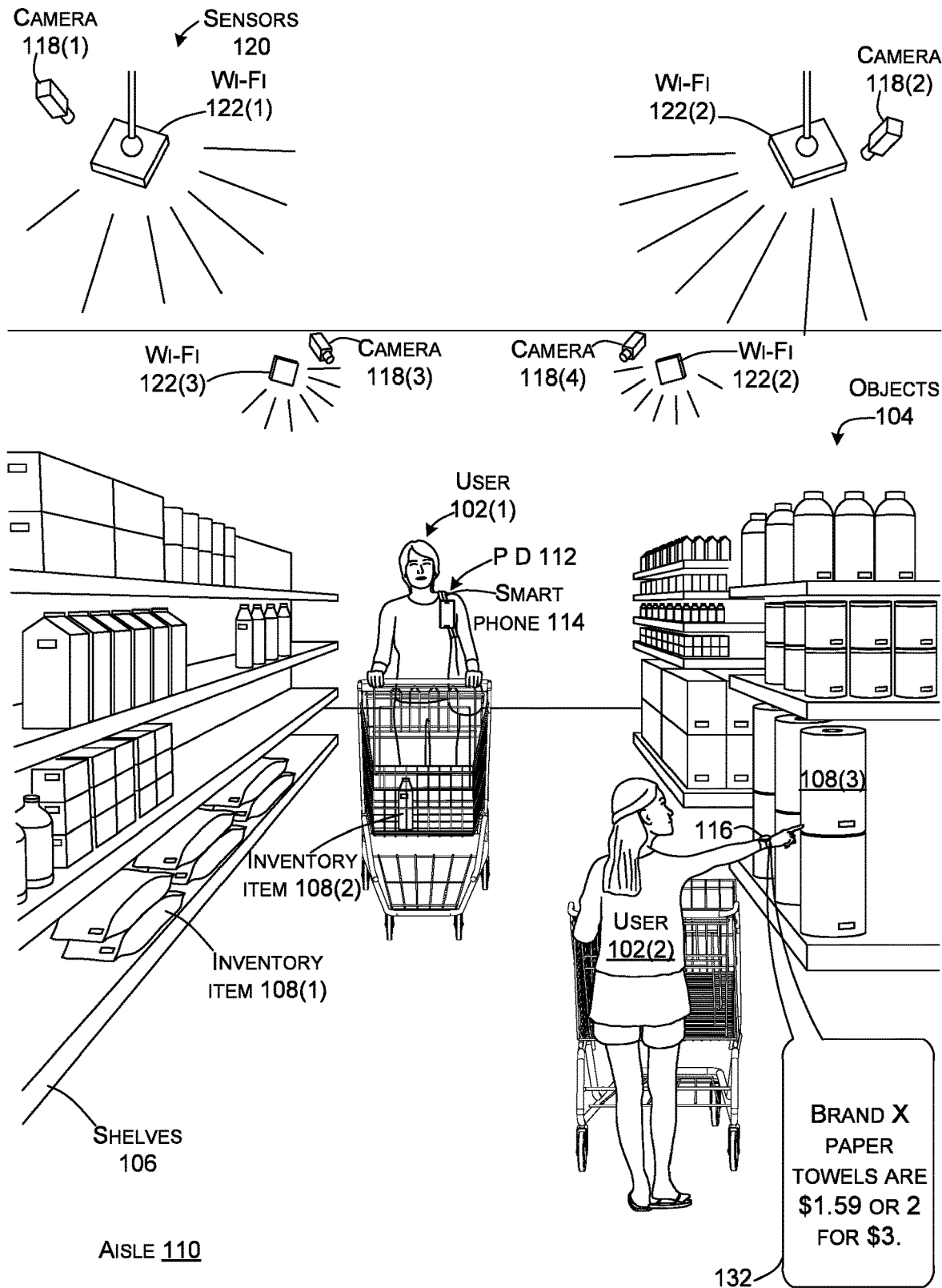

FIG. 1F shows a response to the user query emitted from the user's smart watch at 132. In this case the response is "Brand X paper towels are $1.59 or 2 for $3." In this example, the response accurately answers the user query with pertinent information that could not have been obtained based upon the user query alone.

Figure 1G:
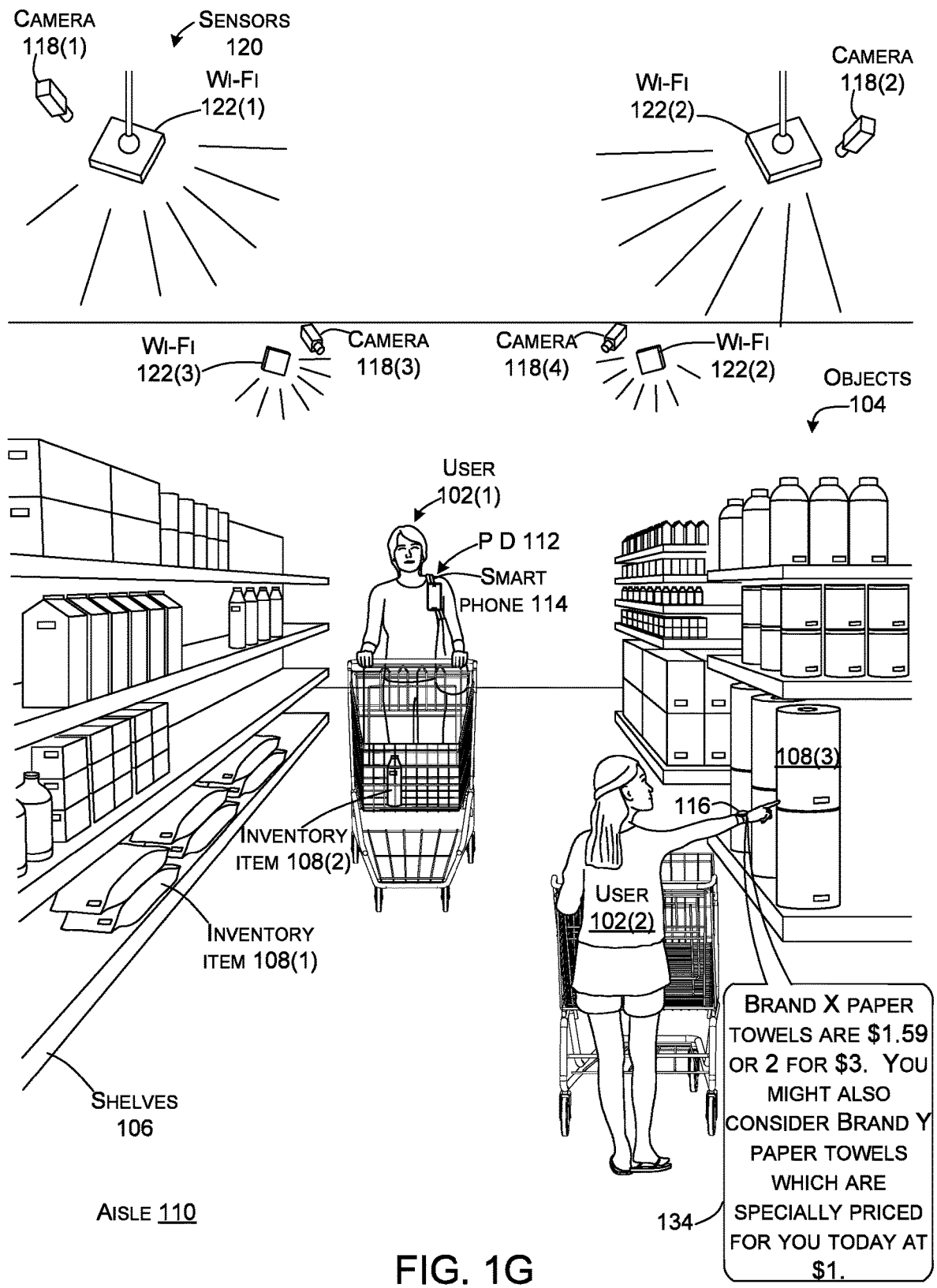

FIG. 1G shows an alternative response to the user query at 134. In this case, the response includes "Brand X paper towels are $1.59 or 2 for $3. You might also consider Brand Y paper towels which are specially priced for you today at $1." Thus, in this case the response includes additional details that may be helpful to the entity and/or the user. In this case, the additional details can be helpful to both the user (e.g., a better price) and the entity (e.g., possibility of selling an item that may have a higher profit margin and/or more of the item in stock, for instance). This is only one example of additional details that can be included in the response. Other examples are described below, such as relative to FIG. 3B.

The scenarios described above illustrate how the present concepts can utilize ambient perception or context-awareness to provide additional information that can reduce limitations of the user's smart devices. In the examples above, the ambient perception captured the visual context of the user interacting with the environment in a way that the user's smart devices could not. Stated another way, the ambient perception can provide simulated vision to the user's smart device. Further, because of its inwardly-looking nature, the simulated vision is independent of the setting of the smart device and therefore superior. For instance, the simulated vision captures the user's gesture(s) toward objects in the context-aware environment from multiple directions and thus is not affected by the position of the user's body and/or blocked by the shopping cart etc.

In contrast, vision capabilities on the smart device (e.g., a camera) are limited by the position of the smart device relative to the user's body. For instance, in FIGS. 1A-1G, user 102(1) has her smart phone 114 pinned to her purse strap. One camera on the phone is pressed against the user's body and cannot capture any images. The opposite facing camera is facing-outwardly and might be capable of capturing some user gestures, such as the user pointing forwards. However, this camera cannot capture other gestures, such as the user pointing to the side or looking over her shoulder. Even more distinguishing, if the user put the smart phone in her purse, the cameras are rendered useless, but the context-awareness offered by the present concepts is unaffected. Thus, from one perspective the present concepts can be viewed as offering simulated perception to the user's device. In the illustrated example, the perception is visual, but other perceptions, such as auditory and/or spatial perceptions can be provided, among others.

Figure 2:
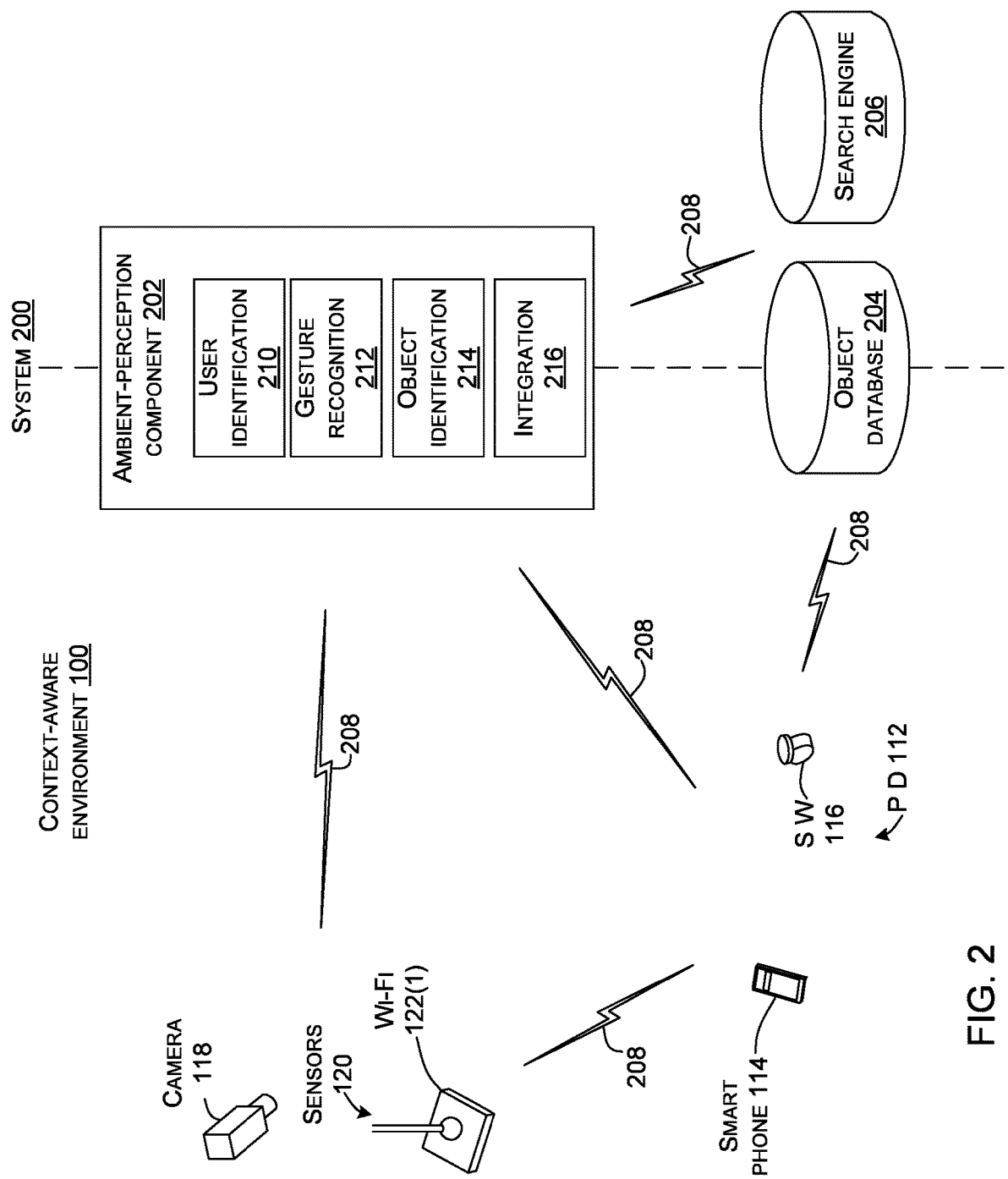
FIGS. 2 and 4 show context-aware systems in accordance with some implementations.

FIG. 2 shows a system 200 that can accomplish context-awareness concepts. The system can include an ambient perception component 202. The ambient perception component can operate relative to devices associated with the context-aware environments, such as cameras 118 and sensors 120 including Wi-Fi sensors 122 as well as users' personal devices, such as smart phone 114 and/or smart watch 116. The ambient perception component 202 can also communicate with an object database 204 associated with the context-aware environments and/or search engines 206. The ambient perception component 202 can communicate with these elements over one or more networks as indicated at 208.

In this example, the ambient perception component 202 can include a user identification module 210, a gesture recognition module 212, an object identification module 214, and/or an integration module 216.

User identification module 210 can process data from sensors 120 and/or cameras 118 to identify users in the context-aware environment 100. For example, the user identification module can derive various biometric parameters from the camera and/or sensor data to identify individual users. For instance, facial parameters can be used for facial recognition. In some implementations, the user identification module 210 can compare biometric parameters of users in the context-aware environment to a database of users that have accounts associated with the context-aware environment. In some cases, the user identification module can employ machine learning to identify the users in the context-aware environment. The system can be trained and/or updated with confirmed user identities. For instance, assume that an individual user enters the context-aware environment. The user identification module can track the user and initially identify the user with a randomly generated but unique ID (e.g., user 1). The user identification module may simultaneously communicate with a smart device that is co-located with user 1. The smart device may positively identify the user as "Mary." Knowing that the unique user 1 is Mary, the user identification module can then use the biometric data as training data to 'learn' how to identify Mary next time she enters the context-aware environment. The user identification module can track the identified users throughout the context-aware environment.

The gesture recognition module 212 can utilize data from cameras 118 and/or sensors 120 to detect user gestures or actions. In some implementations, the gesture recognition module can obtain the biometric parameters from the user identification module 210 and can identify user gestures from the biometric parameters. The gestures can include walking, turning, head movement, looking (e.g., head orientation), picking up, inspecting (e.g., bringing object and head position into linear arrangement), pointing, etc.

Object identification module 214 can identify objects in the context-aware environment 100. In some cases, the object identification module can utilize visual data from camera 118 alone to identify the objects. In other cases, the object identification module can solely utilize sensor data to identify the objects. In other cases, the object identification module can utilize the visual data and/or sensor data in combination with object database 204. For instance, the object identification module may determine that an object is cylindrical, with a white and black label, and is positioned at location xyz in the content-aware environment. The object identification module can then compare this information to information stored in the object database to identify a match. In other cases, sensors 120 may provide identifying information. For instance, objects in the context-aware environment may be associated with tags, such as RFID tags. The sensors can track the location of the RFID tags throughout the store. Information on the RFID tags or referenced in the object database 204 can identify the object and/or various aspects about the object (e.g., weight, brand, ingredients, data of manufacture, and/or expiration date, among others).

Integration module 216 can communicate with personal devices 112. The integration module can receive user interactions with the personal devices. In the example scenarios above relating to FIGS. 1A-1G, the user interactions are user queries to the personal devices. The integration module 216 can augment the user interactions with information from the user identification module 210, gesture recognition module 212, and/or object identification module 214. In the user query examples of FIGS. 1A-1G, the integration module can add details about the users' identities and/or their device identities from the user identification module 210, the gestures the users perform from the gesture recognition module 212, and the identity of objects the user gestures are directed towards from the object identification module 214.

In some cases, the integration module 216 can manage the information from the user identification module 210, gesture recognition module 212, and/or object identification module 214 in a context knowledge graph. Example context knowledge graphs are shown in FIGS. 3A and 3B.

Figure 3A:
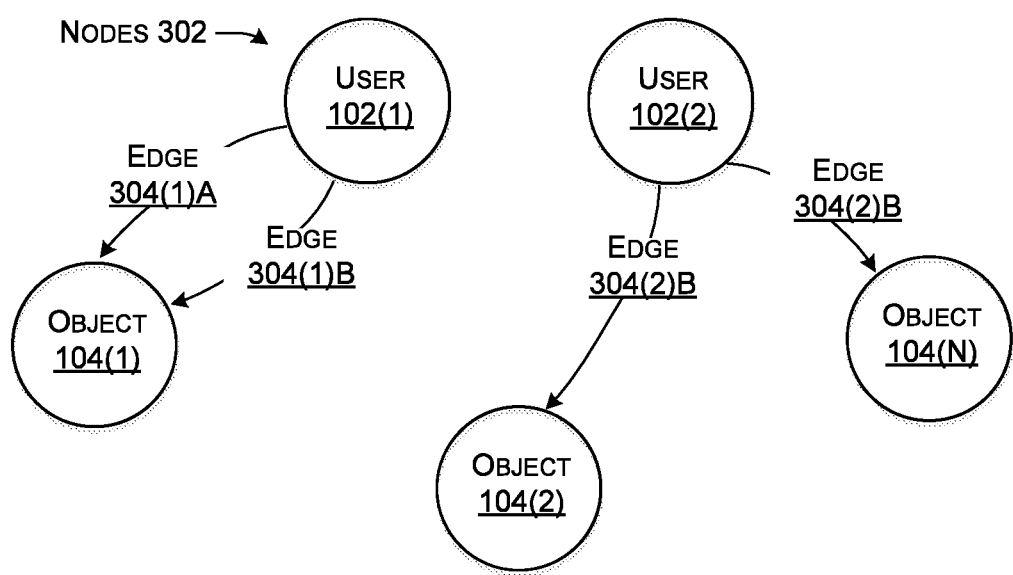
FIGS. 3A and 3B show context knowledge graph examples in accordance with some implementations.
Figure 3B:
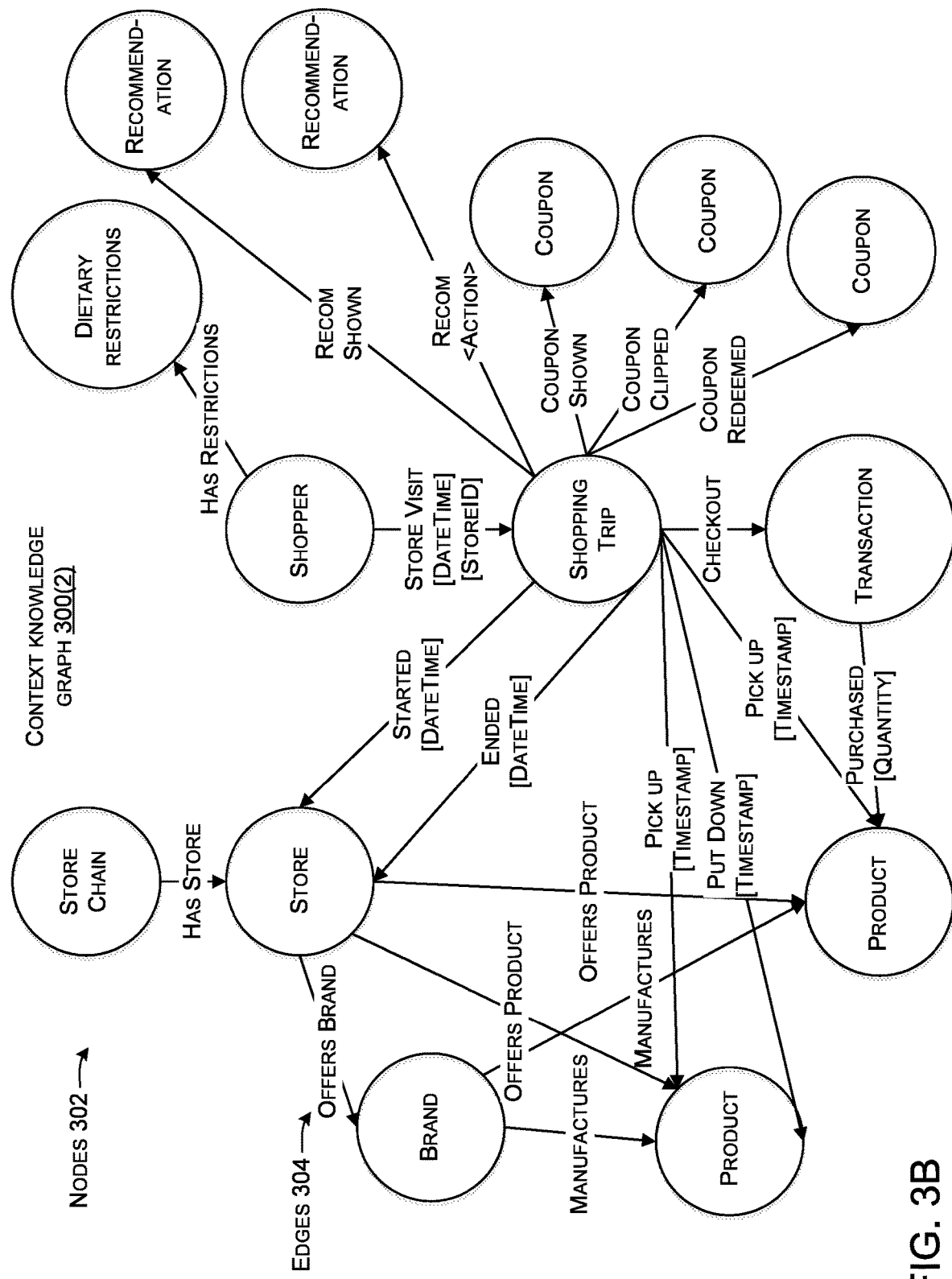

FIG. 3A shows a context knowledge graph 300(1). This context knowledge graph relates to a single context-aware environment (100, FIG. 1). Users 102 and objects 104 can be represented as nodes 302 (e.g., circles)(not all of which are designated with specificity). Individual users 102 can be connected to individual objects 104 by a time stamped edge (e.g., gesture) 304. The edges 304 can provide a likelihood that at this particular time the individual user performed a gesture toward the individual object. Further, the knowledge graph may include multiple edges at the particular point in time between the individual user and the individual object. In that case, individual edges can relate to types of gestures (e.g., was the user pointing at the object or attempting to pick up the object. Such an example is shown between user 102(1) and object 104(1) where edge 304(1)A represents that the user was pointing at object 104(1) and edge 304(1)B represents that the user was picking up object 104(1).

Thus, from one perspective, the integration module (216, FIG. 2) can utilize the information from modules 210-214 to populate the context knowledge graph 300(1). For instance, information from the user identification module 210 can be used to populate the user nodes, information from the object identification module 214 can be used to populate the object nodes, and information from gesture recognition module 212 can be used to populate the edges 304.

Recall that the edges 304 can be time stamped. Thus, when a query is received from a specific user, the gesture that the user performed in closest time match to the query can link the user, the user action (e.g., gesture) and the particular object (e.g., target object). For instance, edge 304(2)A can link user 102(2) to object 104(2) at time 0.1 seconds ago and edge 304(2)B can link user 102(2) to object 104(N) 30 seconds ago. The integration module (216, FIG. 2) can utilize this information from the context knowledge graph 300(1) to augment the user query. The time stamp can be used to match the user to the object at the time the user query was submitted. The stale user actions may be useful for other and/or additional purposes. For instance, the user-to-object relationships may be used to identify objects of interest to the user in the context-aware environment.

The integration module (216, FIG. 2) can also update the context knowledge graph 300(1) (e.g., self-learning or self-improving context knowledge graph). For instance, assume that relative to user 102(1) and object 104(1), edge 304(1)A represents that the user was pointing at object 104(1) with a 60% confidence level and edge 304(1)B represents that the user was picking up object 104(1) with a 40% confidence level. However, assume that directly subsequent camera and/or sensor data confirms that user 102(1) is now holding object 104(1). The integration module can update the confidences of the edges (e.g., 60% to 0% and 40% to 100%, for example). This information can also be used to continue training the gesture recognition module (212, FIG. 2).

FIG. 3B represents a more comprehensive context knowledge graph 300(2) that can relate to multiple context-aware environments, such as multiple stores associated with an entity. For example, the entity could be a brand of stores (e.g., chain) and the multiple context-aware environments could be multiple physical stores. In this case, the nodes 302 represent the entity, the stores, the users/shoppers, dietary restrictions of the shoppers, objects, brands, shopping trips of individual users, recommendations (for individual users), coupons, and/or transactions (e.g., user history), among others. The edges 304 can represent relationships between the nodes (including users gesturing relative to objects, which was explained above relative to FIG. 3A. This context knowledge graph 300(2) can enable the scenarios described above relative to FIGS. 1A-1G as well as additional scenarios. For instance, relative to the scenario of FIG. 1E-1G when the user points at an object (e.g., brand x paper towels) and asks how much they cost. The information in the context knowledge graph 300(2), and in this case the information stored in the 'product' nodes, can allow the user search query to be answered as described in FIG. 1F.

Further, this context knowledge graph 300(2) can allow real-time price adjustments and/or coupons to be generated for this user as described for example relative to FIG. 1G. Further, this context knowledge graph 300(2) can enable brand-switching suggestions to be made to the user as described for example relative to FIG. 1G. For instance, the context knowledge graph 300(2) could show that the user is pointing at brand x paper towels and provide information to answer the query. The context knowledge graph could further indicate that other brands of paper towels are available and that there may be advantages to the user and/or the entity for suggesting these other brands. For instance, the user's shopping history may indicate that the user likes brand y, which for example may be the store brand. The entity may prefer that the user buy brand y over brand x and may be willing to provide an incentive to the user to do so. Therefore, the information contained in context knowledge graph 300(2) could allow the integration module (216, FIG. 2) to augment the user query such that the results shown at 134 of FIG. 1G could be supplanted with content (e.g., additional details) about brand y. For instance, the results could be "Brand x paper towels are $1.58 or 2 for $3. Also, brand y paper towels are available in the aisle to your right and are available to you today for $1."

To reiterate and in reference to FIG. 2, the integration module 216 can utilize some or all of this context information (such as from the knowledge graphs of FIGS. 3A and/or 3B) to augment the original user query. The integration module 216 can send the augmented user query to the object database 204 and/or the search engine 206 and/or access these resources to answer the query.

The object database 204 and/or search engine 206 can send results directly to the personal device involved (represented by lightning bolt between search engine 206 and smart watch 116), such as by using device identification information (e.g., IP address). Alternatively, object database 204 and/or search engine 206 can return the results to the ambient-perception component 202. The ambient-perception component can direct the results to the appropriate personal device 112. The results can be returned in the form received and/or can be customized. For instance, the ambient-perception component can personalize the results with the user's name (e.g., 'Mary' as in 'Mary, brand X paper towels cost $1.59.').

Figure 4:
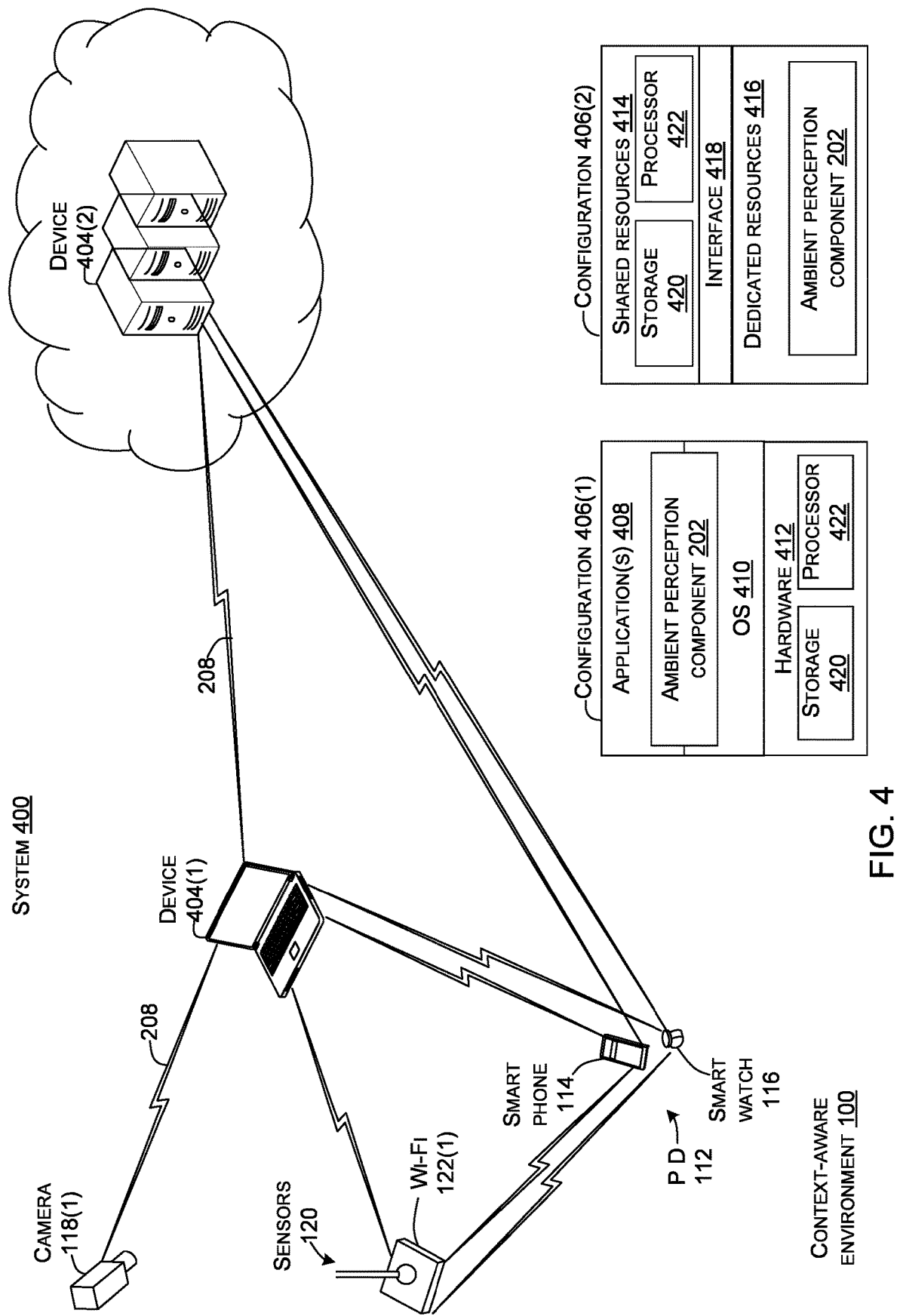

FIG. 4 shows another system 400 that can accomplish context-awareness concepts. For purposes of explanation, system 400 can include cameras 118 and sensors 120 including Wi-Fi sensors 122 as well as users' personal devices 112, such as smart phone 114 and/or smart watch 116.

System 400 can also include one or more devices 404. In the illustrated example, device 404(1) is manifest as a notebook computer device and example device 404(2) is manifest as a server device. The sensors 120, cameras 118, and/or devices 404 can communicate via one or more networks (represented by lightning bolts 208) and/or can access the Internet over the networks. In one configuration, device 404(1) could be located proximate to the context-aware environment 100 (e.g., in the same building), while device 404(2) can be remote, such as in a server farm (e.g., cloud-based resource).

FIG. 4 shows two device configurations 406 that can be employed by devices 404. Individual devices 404 can employ either of configurations 406(1) or 406(2), or an alternate configuration. (Due to space constraints on the drawing page, one instance of each device configuration is illustrated rather than illustrating the device configurations relative to each device 404). Briefly, device configuration 406(1) represents an operating system (OS) centric configuration. Device configuration 406(2) represents a system on a chip (SOC) configuration. Device configuration 406(1) is organized into one or more applications 408, operating system 410, and hardware 412. Device configuration 406(2) is organized into shared resources 414, dedicated resources 416, and an interface 418 there between.

In either configuration 406, the device can include storage/memory 420, a processor 422, and/or an ambient perception component 202.

The ambient perception component 202 can be configured to identify users and objects and to detect when an object is moved and/or referenced in a context-aware environment. For instance, the ambient perception component 202 can be configured to track user locations in the context-aware environment (e.g., in a volume). The ambient perception component 202 can be configured to detect user gestures relative to objects in the volume. The ambient perception component 202 can be configured to, responsive to receiving a query from the user's device, supplement the query with information derived from and/or relating to the objects.

In some configurations, each of devices 404 can have an instance of the ambient perception component 202. However, the functionalities that can be performed by ambient perception component 202 may be the same or they may be different from one another. For instance, in some cases, each device's ambient perception component 202 can be robust and provide all of the functionality described above and below (e.g., a device-centric implementation). In other cases, some devices can employ a less robust instance of the ambient perception component 202 that relies on some functionality to be performed remotely. For instance, device 404(2) may have more processing resources than device 404(1). In such a configuration, ambient perception component 202 on device 404(1) may determine locations of users in the volume utilizing data from the cameras and identify user devices in the volume using data from the sensors. This ambient perception component may identify personal devices and receive queries from individual users via their personal devices, obtain responses for supplemented queries, and send responses to the individual user's personal devices. However, processing intensive tasks, such as identifying users and user gestures may be performed by the ambient perception component on device 404(2). In one such configuration, the ambient perception component can be implemented as an app on the users' personal device that interacts with ambient perception components on device 404(1) and/or device 404(2).

The term "device," "computer," or "computing device" as used herein can mean any type of device that has some amount of processing capability and/or storage capability. Processing capability can be provided by one or more processors that can execute data in the form of computer-readable instructions to provide a functionality. Data, such as computer-readable instructions and/or user-related data, can be stored on storage, such as storage that can be internal or external to the device. The storage can include any one or more of volatile or non-volatile memory, hard drives, flash storage devices, and/or optical storage devices (e.g., CDs, DVDs etc.), remote storage (e.g., cloud-based storage), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

Examples of devices 404 can include traditional computing devices, such as personal computers, desktop computers, servers, notebook computers, etc.

As mentioned above, device configuration 406(2) can be thought of as a system on a chip (SOC) type design. In such a case, functionality provided by the device can be integrated on a single SOC or multiple coupled SOCs. One or more processors 422 can be configured to coordinate with shared resources 414, such as memory/storage 420, etc., and/or one or more dedicated resources 416, such as hardware blocks configured to perform certain specific functionality. Thus, the term "processor" as used herein can also refer to central processing units (CPUs), graphical processing units (GPUs), field programable gate arrays (FPGAs), controllers, microcontrollers, processor cores, or other types of processing devices.

Generally, any of the functions described herein can be implemented using software, firmware, hardware (e.g., fixed-logic circuitry), or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

Figure 5:
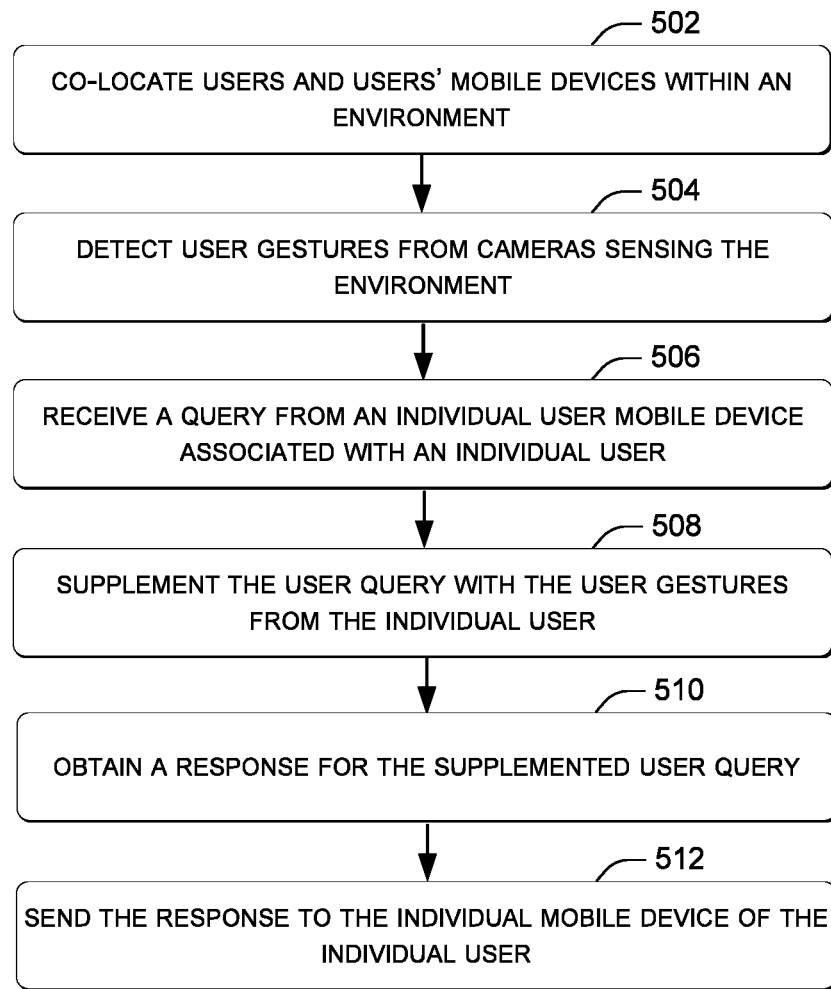
FIGS. 5 and 6 show flowcharts of example methods that can implement some of the present concepts in accordance with some implementations.

FIG. 5 illustrates a flowchart of a context-aware technique or method 500. The method can co-locate users and users' mobile devices within an environment at block 502. At block 504, the method can detect user gestures from cameras sensing the environment. At block 506, the method can receive a query from an individual user's personal (e.g., mobile) device associated with an individual user. At block 508, the method can supplement the user query with the user gestures from the individual user. At block 510, the method can obtain a response for the supplemented user query. At block 512, the method can send the response to the individual mobile device of the individual user.

Figure 6:
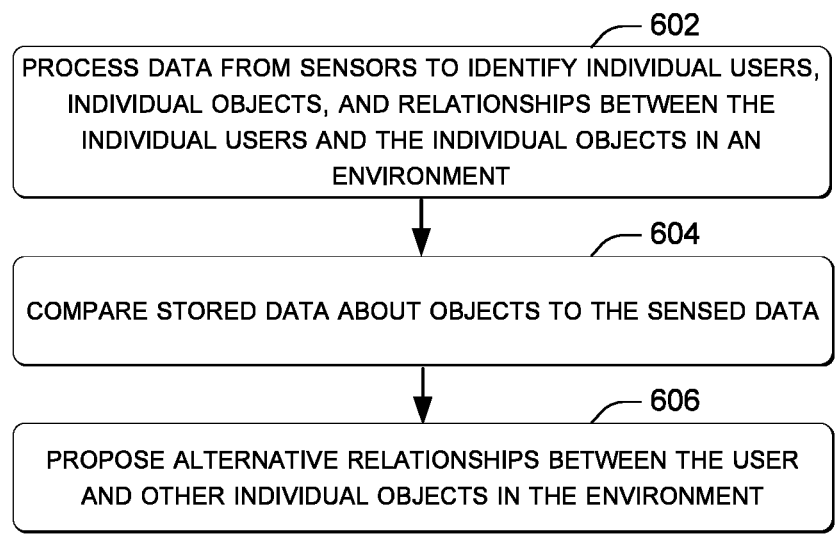

FIG. 6 illustrates a flowchart of a context-aware technique or method 600. The method can process data from sensors to identify individual users, individual objects, and relationships between the individual users and the individual objects in an environment at block 602. At block 604, the method can compare stored data about objects to the sensed data. At block 606, the method can propose alternative relationships between the user and other individual objects in the environment.

One example implementation of method 600 can relate to brand switching where the user is a shopper. Thus, the method can determine relationships between the user and an object. For instance, the user is in the coffee aisle looking at the bags of name brand coffee. The method can suggest alternative bags of coffee to the user (e.g., try to get the user to pick up and purchase Brand B coffee rather than Brand A coffee). For purposes of explanation, this method can identify an existing shopper and merge his/her past purchase history to determine if there is a high probability of the shopper being willing to brand switch from a branded item and to an alternative brand of similar type/quality.

In one implementation, as the shopper walks through the store the method can track the shopper. Based on the shopper's relative location in the store, such as the coffee aisle, incentives can be offered to the shopper to try a particular brand of coffer, such as a store brand. For instance, a coupon could be surfaced on the user's personal device offering a percentage off of the store brand coffee. The incentives can be designed to encourage the shopper to try a given product for themselves. In one implementation, the method can be based upon the user's past history (e.g., willingness to try other brands, especially other brands that the user trusts). In some implementations, this information can be stored in the object database (204, FIG. 2) and/or in the context knowledge graph (300(2), FIG. 3B).

The method can utilize various information about the shopper, such as (1) date and time of the shopping trip (e.g., shoppers tend to buy different items at different times of day) (2) past purchase history at the store (3) customer's previous purchases of any other alternative brand product at the store (4) customer's price sensitivity (5) customer's pick choice at the aisle and shelf level, for example always grabs items from the lower shelf (6) current visit location and journey throughout the store (7) time spent in the store (8) whether he/she has purchased the alternative brand product in the past or not, etc. Once an individual shopper is identified with high probability to brand switch from branded to alternative brands for a given product, and once the shopper gets near the given product's location, the method can notify the shopper about the opportunity. For instance, the method can send a notification to the shopper on their personal device about the real-time discount on the alternative brand product. This can be especially effective when the user enters a query about a product (e.g., "Is this fair trade?"). The method can augment the query with information about the coffee the user is referring to. The method can provide a response that answers the query and offers additional details, such as "the alternative brand is fair trade and is discounted for you."

The described methods can be performed by the systems and/or elements described above and/or below, and/or by other context-aware devices and/or systems.

The order in which the methods are described is not intended to be construed as a limitation, and any number of the described acts can be combined in any order to implement the method, or an alternate method. Furthermore, the method can be implemented in any suitable hardware, software, firmware, or combination thereof, such that a device can implement the method. In one case, the method is stored on one or more computer-readable storage medium/media as a set of instructions (e.g., computer-readable instructions or computer-executable instructions) such that execution by a processor of a computing device causes the computing device to perform the method.

Various examples are described above. Additional examples are described below. One example includes a system comprising cameras positioned around a periphery of an environment that defines a volume, sensors positioned relative to the volume and configured to communicate with user devices in the volume, and a processor configured to determine locations of users in the volume utilizing data from the cameras, to identify the user devices in the volume using data from the sensors, to co-locate individual users and individual user devices, to detect user gestures from the camera data, to receive a query from an individual user, to supplement the query with the user gestures, to obtain a response for the supplemented query and to send the response to the individual user's device.

Another example can include any of the above and/or below examples where the cameras comprise 2D cameras and/or 3D cameras.

Another example can include any of the above and/or below examples where the sensors comprise Bluetooth sensors or Wi-Fi sensors.

Another example can include any of the above and/or below examples where the user gestures include what object the user is looking at when the query is received.

Another example can include any of the above and/or below examples where the processor is further configured to identify the object from the camera data.

Another example can include any of the above and/or below examples where the processor is further configured to obtain information about the object from an object database in the environment.

Another example can include any of the above and/or below examples where in an instance where the user query contains a pronoun, supplementing the query with the user gestures comprises supplementing the query with the information about the object.

Another example includes a system comprising inwardly-facing cameras positioned around a periphery of an environment that defines a volume, sensors positioned relative to the volume and configured to communicate with a user device in the volume, and an ambient perception component configured to track user locations in the volume and to detect user gestures relative to objects in the volume, and responsive to receiving a query from the user's device, to supplement the query with information derived from the objects.

Another example can include any of the above and/or below examples where the ambient perception component is further configured to identify that an individual user gesture is directed to an individual object.

Another example can include any of the above and/or below examples where the ambient perception component is configured to access a database that relates to the objects and obtain information about the individual object.

Another example can include any of the above and/or below examples where the ambient perception component is configured to supplement the query with at least some of the obtained information.

Another example can include any of the above and/or below examples where the ambient perception component is configured to submit the supplemented query to a search tool and send results from the search tool to the user's personal device.

Another example includes a method comprising co-locating users and users' personal devices within an environment, detecting user gestures from cameras sensing the environment, and receiving a query from an individual user's personal device associated with an individual user. The method also comprises supplementing the user query with the user gestures from the individual user, obtaining a response for the supplemented user query, and sending the response to the individual personal device of the individual user.

Another example can include any of the above and/or below examples where the co-locating comprises visually identifying user movements, obtaining micro electromechanical systems (MEMS) data from the personal device, and matching individual users to individual mobile devices based upon similarity between the user movements and the MEMS data.

Another example can include any of the above and/or below examples where the user movements comprise steps and the MEMS data comprises accelerometer data.

Another example can include any of the above and/or below examples where the co-locating comprises determining locations of individual users and correlating individual mobile device with individual users.

Another example can include any of the above and/or below examples where the co-locating comprises tracking locations of the users relative to objects in the environment.

Another example can include any of the above and/or below examples where the detecting user gestures comprises detecting what object an individual user is looking at when the individual user submits the query, or detecting what object an individual user is pointing at when the individual user submits the query.

Another example can include any of the above and/or below examples where the supplementing comprises identifying a name of the object with image recognition.

Another example can include any of the above and/or below examples where the supplementing comprises accessing additional information about the object.

Another example can include any of the above and/or below examples where the accessing additional information about the object comprises accessing a database of objects in the environment.

Another example can include any of the above and/or below examples where in an instance where the user query contains a pronoun, the supplementing comprises supplementing the query with the name and the additional information about the object in place of the pronoun.

Another example includes a system comprising sensors positioned relative to an environment, an object database that stores data about objects in the environment and users associated with the environment, and a processor configured to process data from the sensors to identify individual users, individual objects, and relationships between the individual users and the individual objects in the environment; the processor further configured to compare the stored data to the sensed data and to propose alternative relationships between the user and other individual objects in the environment.

Another example can include any of the above and/or below examples where the relationships comprise the individual user gesturing relative to the individual object.

Another example can include any of the above and/or below examples where the user gesturing comprises holding the individual object or pointing to the individual object.

Another example can include any of the above and/or below examples where the environment comprises a shopping environment.

Another example can include any of the above and/or below examples where stored data comprises historical data about the individual user including the individual user's shopping history.

Another example can include any of the above and/or below examples where the user's shopping history includes brand loyalty data relating to the individual user's preference for specific brands.

Another example can include any of the above and/or below examples where the user's shopping history includes cost sensitivity of the user.

Another example can include any of the above and/or below examples where the relationship between the individual user and the individual object comprises the individual user inspecting the individual object and the proposed alternative relationship comprises a suggestion for the user to buy another brand of the individual object.

Another example can include any of the above and/or below examples where the suggestion includes a cost discount calculated for the individual user so that the other brand of the individual object is less expensive than the individual object.

Another example includes a system comprising inwardly-facing cameras positioned around a periphery of a shopping environment, sensors positioned relative to the shopping environment and configured to communicate with a user device in the shopping environment, and an ambient perception component configured to track user locations in the shopping environment with data from the cameras and to detect a user gesture relative to an object of a first brand in the volume with data from the cameras, to identify an alternative brand of the object that is available in the shopping environment and to send information about the alternative brand of the object to the user device for presentation to the user in the shopping environment.

Another example can include any of the above and/or below examples where the user gesture comprises pointing at the object.

Another example can include any of the above and/or below examples where the user gesture comprises picking up the object.

Another example can include any of the above and/or below examples where the user gesture comprises looking at the object.

Another example can include any of the above and/or below examples where the information about the alternative brand of the object comprises an incentive.

Another example can include any of the above and/or below examples where the incentive includes a time sensitive coupon specific to the user and to the shopping environment.

Another example includes a method comprising identifying users within an environment, detecting a gesture from an individual user relative to an object in the environment, identifying a brand of the object, determining a similar object of an alternative brand, and causing information about the similar object to be presented to the individual user.

Another example can include any of the above and/or below examples where the identifying a brand comprises identifying the object from sensor data and obtaining the brand from an object database relating to the environment.

Another example can include any of the above and/or below examples where the identifying a brand comprises identifying the object from sensor data and obtaining the brand from a context knowledge graph relating to the environment.

Another example can include any of the above and/or below examples where the brand, the object, and the similar object comprise nodes of the context knowledge graph.

Another example can include any of the above and/or below examples where the causing comprises sending the information to a personal device associated with the user brand.

CONCLUSION

Although the subject matter relating to context-awareness has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A system, comprising:
cameras positioned around a periphery of an environment that defines a volume;
sensors positioned within the volume of the environment;
an object database that stores data about objects in the environment and users associated with the environment; and,
a processor configured to process data from the cameras and the sensors to identify users that are in the environment, locations of the users in the environment, objects in the environment, and relationships between an individual user and an individual object in the environment. The processor further configured to compare the stored data to sensed data to identify relationships between the individual object and other objects in the environment, to propose one of the other objects to the user as an alternative to the individual object based at least in part upon a past purchase history of the user, a price sensitivity of the user, and a path of the user through the environment, and to provide location information for the one of the other objects relative to the location of the user in the environment.

2. The system of claim 1, wherein the relationships comprise the individual user gesturing relative to the individual object.

3. The system of claim 1, wherein the user gesturing comprises holding the individual object or pointing to the individual object.

4. The system of claim 1, wherein the environment comprises a shopping environment.

5. The system of claim 4, wherein the stored data comprises historical data about the individual user including purchases of the individual user at specific times of day, preferences of the user regarding individual aisles in the environment and preferences for particular vertical heights for object selection.

6. The system of claim 5, wherein the past purchase history of the user includes brand loyalty data relating to the user's preference for specific brands.

7. The system of claim 5, wherein the past purchase history of the user includes past purchases in the environment and in other environments.

8. The system of claim 7, wherein the relationships between the individual user and the individual object comprise the individual user inspecting the individual object and the proposed one of the objects comprises a suggestion for the user to buy another brand of the individual object.

9. The system of claim 8, wherein the suggestion includes a cost discount calculated for the individual user so that the another brand of the individual object is less expensive than the individual object.

10. A system, comprising:
inwardly-facing cameras positioned around a periphery of a shopping environment;
sensors positioned relative to the shopping environment and configured to communicate with a user device in the shopping environment; and,
an ambient perception component configured to track user locations in the shopping environment with data from the cameras, to detect a user gesture relative to an object of a first brand in the shopping environment with data from the cameras, to identify alternative brands of the object that are available in the shopping environment, to select an individual alternative brand of the object based at least in part upon a date and time that a user is in the shopping environment, past purchase history of the user in the shopping environment and other shopping environments including purchases of alternative branded objects, and to send information about the selected individual alternative brand of the object to the user device for presentation to the user in the shopping environment.

11. The system of claim 10, wherein the user gesture comprises pointing at the object.

12. The system of claim 10, wherein the user gesture comprises picking up the object.

13. The system of claim 10, wherein the user gesture comprises looking at the object.

14. The system of claim 10, wherein the information about the selected individual alternative brand of the object comprises an incentive.

15. The system of claim 14, wherein the incentive includes a time sensitive coupon specific to the user and to the shopping environment.

16. A method, comprising:
identifying users within an environment;
detecting a gesture from an individual user relative to an object in the environment;
identifying a brand of the object;
determining whether similar objects of alternative brands are present in the environment;
employing a context knowledge graph to determine a probability of the individual user purchasing an individual similar object based at least in part upon a time of day, a path of the user within the environment, and a purchase history of the individual user relating to the alternative brands; and,
based at least in part upon the probability of the individual user purchasing the individual similar object, causing information about the individual similar object to be presented to the individual user.

17. The method of claim 16, wherein the identifying a brand comprises identifying the object from sensor data and obtaining the brand from an object database relating to the environment.

18. The method of claim 16, wherein the identifying a brand comprises identifying the object from sensor data and obtaining the brand from the context knowledge graph relating to the environment.

19. The method of claim 18, wherein the brand, the object, and the individual similar object comprise nodes of the context knowledge graph.

20. The method of claim 16, wherein the causing comprises sending the information to a personal device associated with the individual user.

\* \* \* \* \*

UNITED STATES PATENT AND TRADEMARK OFFICE
CERTIFICATE OF CORRECTION

PATENT NO. : 10,748,002 B2
APPLICATION NO. : 15/965581
DATED : August 18, 2020
INVENTOR(S) : Abhishek Abhishek et al.

It is certified that error appears in the above-identified patent and that said Letters Patent is hereby corrected as shown below:

In the Claims

Column 14, Line 52, Claim 1: delete "environment. The processor" and insert --environment, the processor--.

Signed and Sealed this
Sixth Day of April, 2021

Drew Hirshfeld
*Performing the Functions and Duties of the
Under Secretary of Commerce for Intellectual Property and
Director of the United States Patent and Trademark Office*